United States Patent
Kim

(10) Patent No.: US 7,110,892 B2
(45) Date of Patent: Sep. 19, 2006

(54) APPARATUS AND METHOD FOR DETERMINING STRENGTH OF IMPACT WHEN CLOSING A FOLDER-TYPE TERMINAL

(75) Inventor: Jae Eung Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 57 days.

(21) Appl. No.: 10/888,176

(22) Filed: Jul. 9, 2004

(65) Prior Publication Data

US 2005/0043904 A1 Feb. 24, 2005

(30) Foreign Application Priority Data

Aug. 21, 2003 (KR) .................. 10-2003-0057910

(51) Int. Cl.
*G01L 5/00* (2006.01)
*H04M 1/00* (2006.01)

(52) U.S. Cl. ........................... 702/41; 455/575.3

(58) Field of Classification Search .............. 702/33, 702/41–44; 455/566, 575.3; 379/433.11, 379/433.13
See application file for complete search history.

(56) References Cited

U.S. PATENT DOCUMENTS

| 6,628,974 B1 * | 9/2003 | Lim | ......................... 455/575.3 |
| 2004/0203522 A1 * | 10/2004 | Lim | ............................ 455/90.3 |

* cited by examiner

*Primary Examiner*—Michael Nghiem
(74) *Attorney, Agent, or Firm*—Lee, Hong, Degerman, Kang & Schmadeka

(57) ABSTRACT

An apparatus and method for determining the strength of impact of closing the folder portion of a folder-type terminal are disclosed. When closing of the folder portion is detected, the impact force generated when the folder portion contacts the main body portion is measured, the relative strength of the measured impact force is determined, and an output corresponding to the measured impact force is generated.

26 Claims, 4 Drawing Sheets

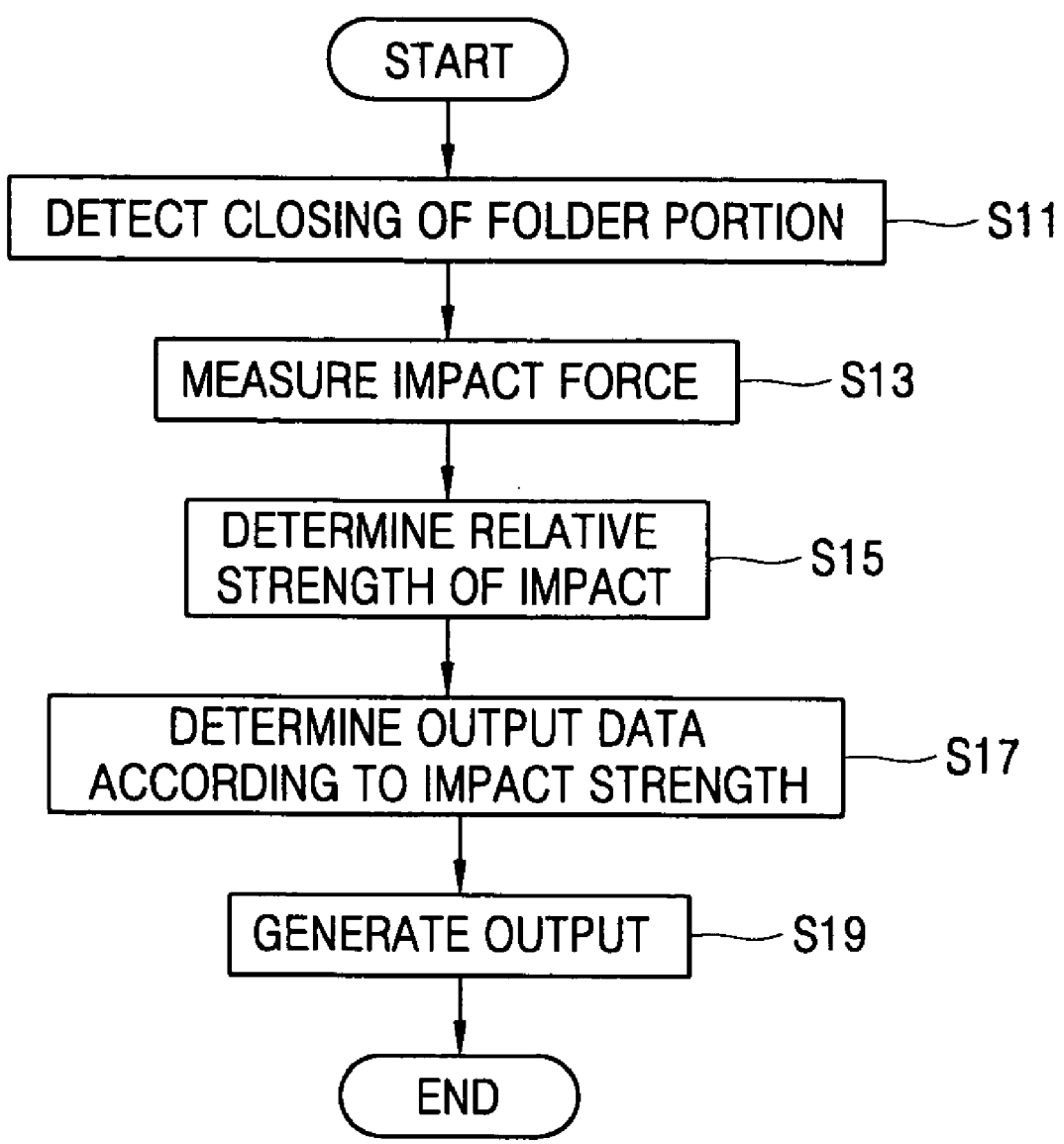

APPARATUS AND METHOD FOR DETERMINING STRENGTH OF IMPACT WHEN CLOSING A FOLDER-TYPE TERMINAL

CROSS-REFERENCE TO RELATED APPLICATIONS

Pursuant to 35 U.S.C. § 119(a), this application claims the benefit of earlier filing date and right of priority to the Korean Application No. 57910/2003, filed on Aug. 21, 2003, the content of which is hereby incorporated by reference herein in its entirety.

BACKGROUND OF THE INVENTION

1. Field of the Invention

The present invention relates to a folder-type terminal and, more particularly, to an apparatus and method for determining the strength of impact when the folder portion of a folder-type terminal is closed and generating a display corresponding to the determined strength of impact.

2. Description of the Related Art

As the use of mobile communications terminals has increased, the use of folder-type terminals has increased. Although such terminals have an advantage in that they are more compact and less bulky to store and carry, they also have disadvantages.

One of the disadvantages is that users have experienced an increased occurrence of breakage in the folder portion of these terminals. One of the possible reasons for this breakage is that users tend to close the terminals with sufficient force to weaken and damage the apparatus attaching the folder portion to the main body portion of the terminal. Although it is known in the art to sense the opening and closing of a folder-type terminal, sensing the impact upon closing such a terminal would allow the user to determine if he or she is closing the terminal in a manner that may lead to damage to the folder portion.

FIG. 1 illustrates one example of a conventional apparatus for sensing the closure of the folder portion of a folder-type terminal. The terminal 1 includes a folder portion 10 with a protrusion 11 at a certain position along the folder portion and a main body portion 20 having a contact switch 21 at a position where the protrusion contacts the main body portion.

As illustrated in FIG. 1, the terminal 1 detects opening and closing of the folder portion 10 by a mechanical contact between the protrusion 11 and the contact switch 21. When the folder portion 10 is closed, the protrusion 11 of the folder 10 depresses the contact switch 21 of the main body portion 20 to cut off (or supply) a current flowing to the contact switch 21. Accordingly, the terminal 1 detects opening or closing of the folder 10 based on whether or not current flows at the contact switch 21.

Although the terminal 1 illustrated in FIG. 1 can determine whether the folder portion 10 is open or closed, it can detect only the fully open or fully closed configuration, not the configuration where the folder portion 10 is in the process of closing. Furthermore, the terminal 1 illustrated in FIG. 1 cannot determine the force with which the folder portion 10 is closed.

FIG. 2 illustrates another example of a conventional apparatus for sensing the closure of the folder portion of a folder-type terminal. The terminal 25 includes a folder portion 30 having a magnet 31 at a certain position along the folder portion and a main body portion 40 having a Hall effect switch 41 for sensing the magnetic field of the magnet of the folder portion.

As illustrated in FIG. 2, the terminal 25 detects opening and closing of the folder portion 30 by using a Hall effect switching method. As the folder portion 30 is closed, the magnet 31 nears the Hall effect switch 41 of the main body portion 40. The Hall effect switch 41 senses the magnetic field of the magnet 31 and changes an output accordingly. A Mobile Station Modem (MSM) (not shown) of the main body portion 40 detects the change in the output of the Hall effect switch 41 and determines whether the folder portion 30 is open or closed.

The terminal 25 illustrated in FIG. 2 may be able to determine the "imminent closure" configuration in addition to the fully closed and fully open configuration. However. The terminal 25 illustrated in FIG. 2 still cannot detect the force with which the folder portion 30 is closed.

Therefore, there is a need for an apparatus that can determine not only the closing or opening of the folder portion of a folder-type terminal, but also the force with which the folder portion is closed. The present invention addresses this and other needs.

SUMMARY OF THE INVENTION

The present invention is directed to an apparatus and method for detecting the closure of the folder portion of a folder-type device and generating a display indicative of the strength of the impact of the folder portion against the main body portion.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied an apparatus for detecting the closure of the folder portion of a folder-type device. Specifically, an apparatus is provided that detects closure of the folder portion of a folder-type device, measures the impact of the closure, and generates a display to the user that is indicative of the strength of the impact.

In one aspect of the invention, means are provided for detecting closure of the folder portion of a folder-type device, measuring the force with which the folder portion is closed, comparing the measured force with predetermined levels of force, and generating an output to inform the user of the force with which the folder portion was closed.

The predetermined levels of force for comparison to the measured force as well as displays corresponding to each predetermined level of force are provided in a storage means. A processing means controls a detecting means, measuring means, output means, and storage means as well as performing the comparison of the measured impact to the predetermined levels of impact.

The detecting means determines whether the folder portion is open or closed. It is contemplated that the detecting means may be adapted to determine when the folder portion is at a specific angle with respect to the main body portion of the device in order to activate the measuring means in time to measure the impact of the closure of the folder portion. Preferably, the detecting means includes a magnet in the folder portion and a sensor in the main body portion such that the magnetism of the magnet is sensed to determine when the folder portion is in proximity to the main body portion.

The measuring means is adapted to measure the impact force when the folder portion contacts the main body portion. Preferably the measuring means includes a microphone for recording the impact sound, an amplifier for amplifying the recorded sound, and a filter, for example a low-pass filter, for converting the amplified sound to a DC level.

The output means conveys to the user of the device the force with which the folder portion was closed in order to educate the user in the proper level of force with which to close the folder portion without damaging the device. It is contemplated that both an audible and visual message may be conveyed to the user.

The storage means is adapted to store information regarding predetermined levels of folder portion closure impact force as well as corresponding messages to be conveyed to the user via the output means. It is contemplated that digital data corresponding to several different levels of folder portion closure impact force may be stored, for example levels corresponding to an acceptable closing force, a minimally acceptable closing force, and an unacceptable closing force. It is further contemplated that the predetermined levels of folder portion closure impact force may be determined based on the characteristics of the specific device for which the apparatus is used.

The processing means controls the other means and performs the comparison of the impact force measured by the measuring means to the predetermined folder portion closure impact force levels stored on the storage means. It is contemplated that the processing means may be adapted to monitor the detecting means in order to determine when the angle between the folder portion and main body portion narrows to a specific angle such that the measuring means may be activated to measure the impact force upon folder portion closure. Preferably, the processing means includes an analog-digital converter to convert a DC level from the measuring means to digital data which may be compared to digital data stored in the storage means.

In another aspect of the invention, an apparatus is provided for detecting closure of the folder portion of a folder-type device, measuring the force with which the folder portion is closed, comparing the measured force with predetermined levels of force, and generating an output to inform the user of the relative force with which the folder portion was closed. The apparatus includes a detector, an audio circuit, a driving unit, a strength determining unit, an output unit, and a memory.

The detector determines whether the folder portion is open or closed. It is contemplated that the detector may be located in the main body portion of the device and sense the magnetism of a magnet in the folder portion in order to determine the relative proximity of the folder portion to the main body portion. Preferably, the detector includes a Hall effect device.

The audio circuit receives and records the impact sound upon closing the folder portion. Preferably, the audio input circuit includes a microphone for recording the impact sound, an amplifier for amplifying the recorded impact sound and a filter, for example a low-pass filter, to convert the amplified impact sound to a DC level.

The driving unit provides power to the audio circuit when closure of the folder portion is detected. It is contemplated that the driving circuit will power the audio circuit when the folder portion is at a specific angle with respect to the main body portion such that the audio circuit may record the impact sound a predetermined amount of time later when the folder portion contacts the main body portion.

The strength determining unit performs functions similar to a processor. The strength determining unit determines the strength with which the folder portion was closed and generates the appropriate display.

The strength determining unit determines the strength of the folder portion closure by controlling the driving unit to power the audio circuit to record the impact sound upon folder portion closure and then comparing the recorded impact sound to predetermined levels of folder portion closure impact force that are stored in the memory. Once the relative strength of the impact sound is determined, the strength determining unit retrieves the corresponding output data from the memory and transfers the output data to the output unit. Preferably, the strength determining unit includes an analog-digital converter and is adapted to control the driving unit when the detector determines that the folder portion is at a specific angle with respect to the main body portion.

The output unit receives the output data from the strength determining unit and conveys to the user the force with which the folder portion was closed. It is contemplated that audio and/or visual data may be conveyed to the user. Preferably, the output unit includes a speaker and an LED or LCD.

The memory contains digital data corresponding to one or more predetermined levels of folder portion closure impact force and output data corresponding to each level of impact force. Preferably the memory contains digital data corresponding to at least an acceptable closing force, a minimally acceptable closing force, and an unacceptable closing force as well as related audio and visual output data.

In another aspect of the invention, a method is provided for detecting closure of the folder portion of a folder-type device, measuring the force with which the folder portion is closed, comparing the measured force with predetermined levels of force, and generating an output to inform the user of the force with which the folder portion was closed. The method utilizes the apparatus described with respect to the other aspects of the invention and includes the steps of detecting closure of the folder portion, measuring the impact force upon closure of the folder portion, determining the relative strength of the impact force, and generating an output corresponding to the measured strength of the impact force.

It is contemplated that the step of detecting closure of the folder portion may include determining when the folder portion is at a specific angle with respect to the main body portion. Preferably, this step utilizes a magnet in the folder portion and a Hall effect device in the main body portion to sense the magnetism of the magnet.

It is contemplated that the step of measuring the impact force may utilize an audio circuit that is powered upon detecting closure (or imminent closure) of the folder portion. Preferably, the audio circuit includes a microphone to record the impact sound, an amplifier to amplify the recorded sound, and a filter to convert the recorded impact sound to a DC level.

It is contemplated that the step of determining the strength of the measured impact force may include comparing digital data corresponding to the recorded impact sound to digital data corresponding to predetermined levels of folder portion closure impact force that are stored in memory. Preferably a processor having an analog-digital converter is utilized.

It is contemplated that the step of generating an output may include retrieving predetermined audio and visual digital data corresponding to the determined relative strength of the recorded impact sound from memory and transferring the digital data to an output unit adapted to provide both an audio and a visual output. Preferably, the output unit includes a speaker and an LED or LCD.

Other features and advantages of the present invention will become apparent from the following detailed description taken in conjunction with the accompanying drawings, which illustrate, by way of example, the principles of the invention.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 5 is a flow chart of a method for sensing the impact strength of closing of the folder portion of a folder-type terminal in accordance with the present invention.

DETAILED DESCRIPTION OF THE PREFERRED EMBODIMENTS

The present invention relates to an apparatus and method for detecting the closure of the folder portion of a folder-type device and generating an output indicative of strength of the impact of the folder portion against the main body portion. Although the present invention is illustrated with regard to a folder-type mobile communication terminal, such as a mobile phone, it is contemplated that the present invention may be utilized with any folder-type device.

Figure 1:
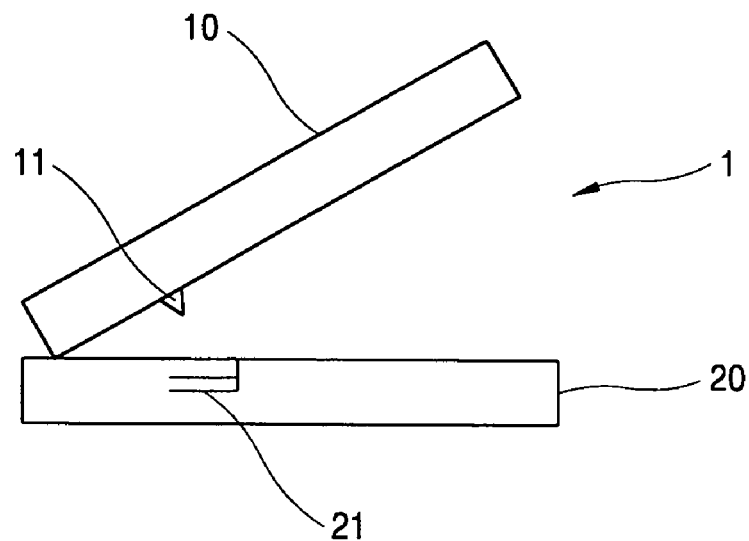
FIG. 1 illustrates one example of an apparatus for sensing the closing of the folder portion of a folder-type terminal in accordance with conventional art.
Figure 2:
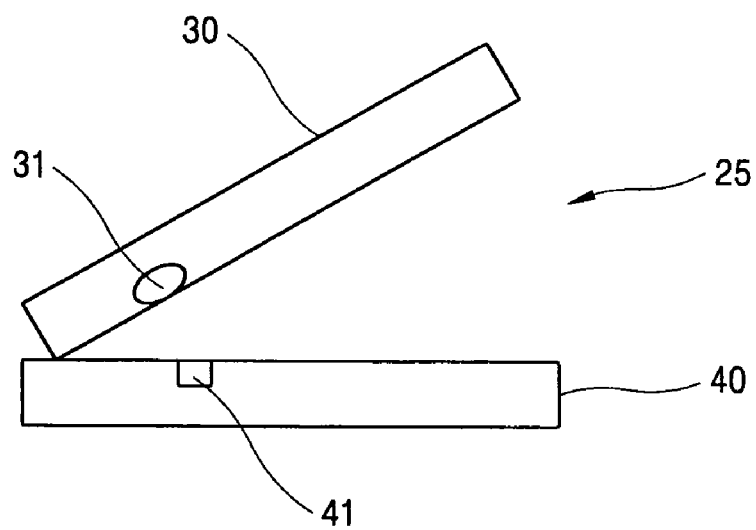
FIG. 2 illustrates another example of an apparatus for sensing the closing of the folder portion of a folder-type terminal in accordance with conventional art.
Figure 3:
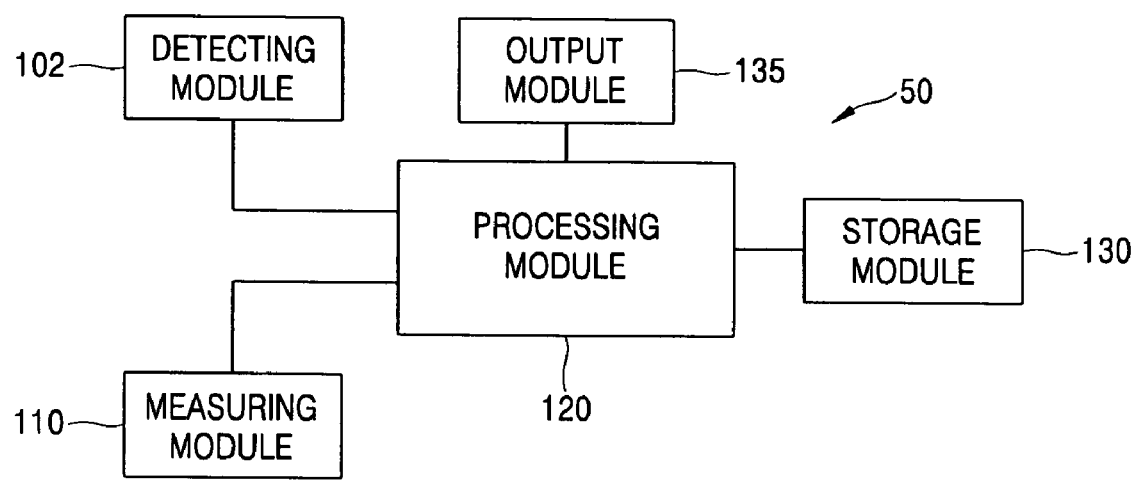
FIG. 3 illustrates one embodiment of an apparatus for sensing the impact strength of closing of the folder portion of a folder-type terminal in accordance with the present invention.

Referring to FIG. 3, one embodiment of the present invention is shown. The apparatus 50 includes detecting module 102, measuring module 110, storage module 130, output module 135, and processing module 120. It is contemplated that that the majority of the apparatus is located in the main body portion (not shown) of a folder-type device.

The detecting module 102 determines when the folder portion (not shown) of a folder-type device is closed. It is contemplated that the detecting module may be adapted to determine when the folder portion is at a specific angle with respect to the main body portion such that the imminent closure of the folder portion may be determined, thereby allowing the measuring means 110 to be activated before the folder portion is fully closed.

The measuring module 110 measures the impact force when the folder portion contacts the main body portion. It is contemplated that the measuring module 110 may convert a recorded impact sound to a DC level that is utilized by the processing means 120.

The storage module 130 contains information regarding predetermined levels of folder portion closure impact force as well as corresponding messages to be conveyed to the user via the output module 135. It is contemplated that the information is stored as digital data. It is further contemplated that information and messages corresponding to several different levels of folder portion closure impact force may be stored, for example levels corresponding to an acceptable closing force, a minimally acceptable closing force, and an unacceptable closing force. The levels may be determined based on the characteristics of the specific device for which the apparatus is used.

The output module 135 is utilized to convey to the user of the device the force with which the folder portion was closed. The output module 135 conveys messages based on the information stored in the storage module 130 for each of the predetermined levels of folder portion closure impact force. By informing the user of the force with which the folder portion is closed, the user may be educated regarding the proper level of force to use to avoid damaging the device. It is further contemplated that both audio and visual messages may be conveyed.

The processing module 120 controls the other modules and performs the comparison of the impact force measured by the measuring module 110 to the predetermined folder portion closure impact force information stored in the storage module 130. It is contemplated that the processing module 120 includes an analog-digital converter to convert a DC level from the measuring module 110 to digital data for comparison to digital data stored in the storage module 130. It is further contemplated that the processing module 120 may be adapted to monitor the detecting module 102 in order to determine when the angle between the folder portion and main body portion narrows to a specific angle such that the measuring module 110 may be activated to measure impact force a predetermined time later, thereby recording the impact force when the folder portion contacts the main body portion.

In operation, the processing module 120 monitors the detecting module 102 to determine when the folder portion of a folder-type device is closed. Upon closure, the processing module 120 activates the measuring module 110 to measure the impact force. The processing module 120 then retrieves the measured impact force and compares it to predetermined levels of folder portion closure impact force stored in the storage module 130 to determine the relative strength of the impact. The processing module 120 then retrieves the corresponding output information from the storage means 130 and transfers the information to the output module 135.

Figure 4:
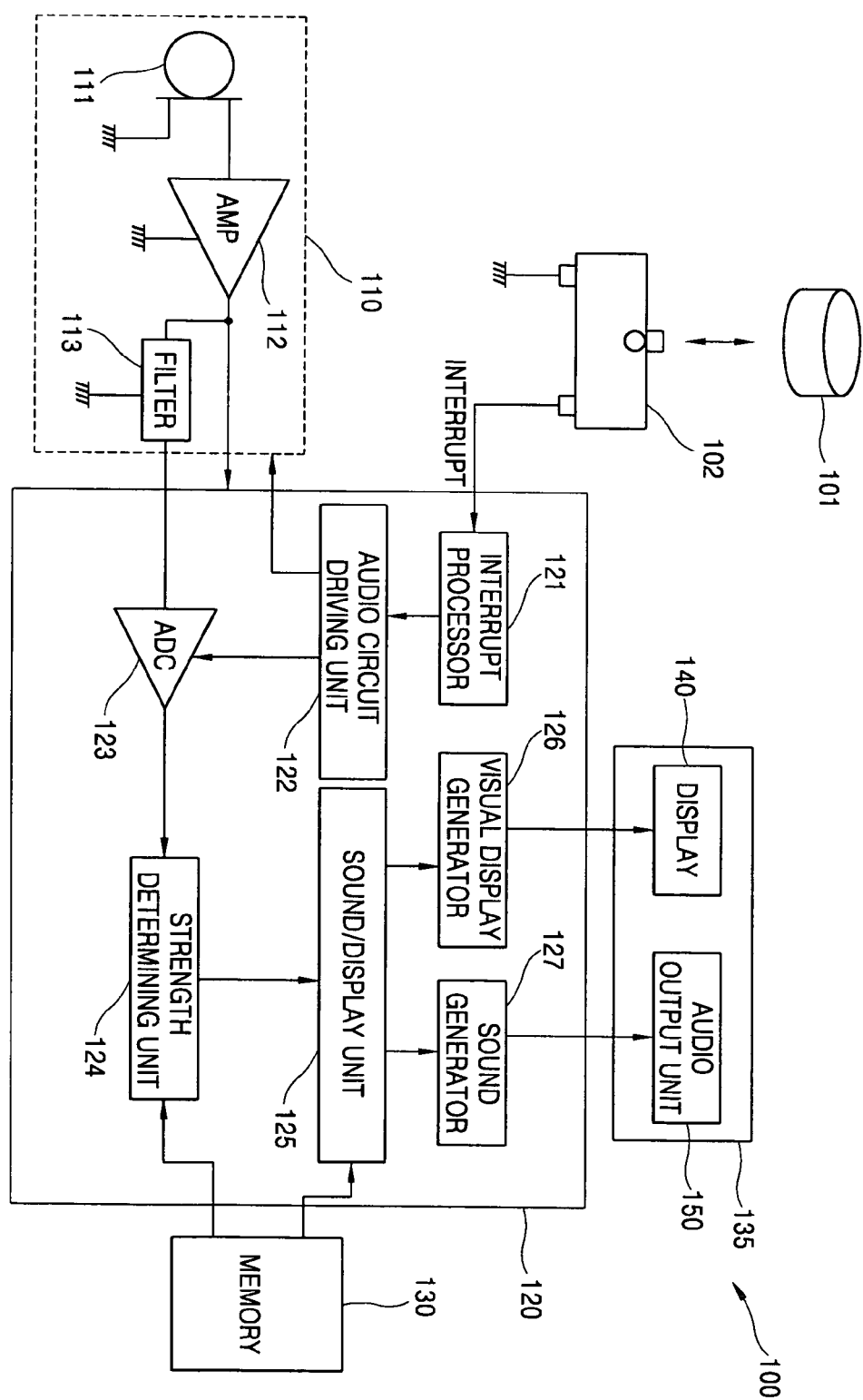
FIG. 4 illustrates another embodiment of an apparatus for sensing the impact strength of closing of the folder portion of a folder-type terminal in accordance with the present invention.

A preferred embodiment of the apparatus 100 is illustrated in FIG. 4. The detecting module 102 is preferably a Hall effect device and the folder portion (not shown) has a magnet 101 therein. The measuring module 110 is an audio circuit. The storage module 130 is a memory. The output module 135 includes both a display and audio output unit. The processing module 120 is preferably a Mobile Station Modem (MSM).

The audio circuit 110 includes a microphone 111, an amplifier 112, and a filter 113, preferably a Low Pass Filter (LPF). The microphone records the impact sound generated when the folder portion is closed. The amplifier 112 amplifies the recorded impact sound according to a predetermined gain. The filter 113 converts the amplified impact sound to a DC level.

The MSM 120 includes an interrupt processor 121, an audio circuit driving unit 122, an analog-digital converter (ADC) 123, a strength determining unit 124, a sound/display unit 125, a visual display generator 126, and a sound generator 127.

The interrupt processor 121 generates an interrupt when the Hall effect device 102 detects closure of the folder portion. The audio circuit driving unit 122 activates the audio circuit 110 under the control of the interrupt processor 121. Preferably, the interrupt is generated prior to complete closure of the folder portion such that the audio circuit is activated in time to record the impact sound when the folder portion contacts the main body portion.

The ADC converts a DC level indicative of the impact sound from the audio circuit 110 to a digital signal. The strength determining unit 124 compares the output of the ADC to digital data corresponding to predetermined levels of folder portion closure impact force retrieved from the memory 130 in order to determine the relative strength of the recorded impact sound.

The sound/display unit 125 retrieves audio and visual data corresponding to the determined relative strength of the recorded impact sound from the memory 130. The visual display generator 126 transfers the visual data to a display 140, preferably an LED or LCD. The sound generator 127 transfers the audio data to an audio output unit 150.

In operation, the audio circuit 110 is activated upon detection of closure of the folder portion at a specific angle between the folder portion and main body portion. Once activated, the audio circuit 110 records the impact sound generated a predetermined time later when the folder portion contacts the main body portion. The relative strength of the recorded impact sound with respect to predetermined levels of folder portion closure impact force is determined by the MSM 120 and various sounds and visual displays are created according to the determined relative strength of impact.

For example, the strength of the impact sound recorded when the folder portion is closed may be compared to, for example, four predetermined levels stored in the memory 130; the first and second levels being acceptable levels of closing force, the third level a marginally-acceptable level of closing force, and the fourth level an unacceptable level of closing force. Corresponding sounds and visual data may be set according to the relative impact strength level.

If the determined strength of impact upon closing the folder portion is at or below the first level, a sound such as 'You are too weak! Thank you!' may be generated. If the determined strength of impact in closing the folder portion is between the first and second levels, a sound such as 'Wow! You are too careful!' may be generated. If the determined strength of impact in closing the folder portion is between the second and third levels, a sound such as 'Thank you for closing gently!' may be generated. If the determined strength of impact in closing the folder portion is between the third and the fourth level, a sound such as 'Please close gently!' may be generated. If the determined strength of impact in closing the folder portion is above the fourth level, a sound such as 'Ouch! It hurts. Please close gently!' may be generated. In addition, each sound may also have an associated visual display in the form of a character or amusing image.

Referring to FIG. 5, a flow chart of a method of using the apparatus of the present invention is illustrated. The method includes the steps of detecting closure of the folder portion (S11), measuring the impact force (S13), determining the relative strength of the measured impact force (S15), determining output data according to impact strength (S17), and generating an output (S19).

In use, when the folder portion of a folder-type terminal is opened, it moves about the main body portion. When the folder portion is completely closed, the folder portion and the main body portion are at the angle of 0°.

In step S11, a detector 102 such as a Hall effect device is utilized to determine when the folder portion is closed. For example, the detector may determine when the angle between the folder portion and the main body portion narrows to a specific angle, thereby indicating imminent closure the folder portion. When the detector 102 senses closure of the folder portion, an output level is generated to indicate detection of folder portion closing. A processor 120 such as an MSM receives the output level and generates an interrupt.

In step S13 an interrupt processor 121 controls a driving unit 122. The driving unit 122 activates a measuring module 110 such as an audio circuit, for example, by applying power to a microphone 111, setting a predetermined amplification gain for an amplifier 112, and applying power to initialize an ADC 123.

After a predetermined time to allow for the angle between the folder portion and main body portion to decrease to 0°, the microphone 111 records the impact sound. The recorded impact sound is amplified by the amplifier 112 and filtered by a filter 113, with the resulting DC level converted by the ADC 123 to a digital signal.

In step S15, a strength determining unit 124 in the MSM 120 determines the relative strength of the measured impact force. The strength determining unit 124 retrieves the digital data for predetermined levels of folder portion closure impact force from a memory 130 and compares that digital data to the digital signal corresponding, for example, to the recorded impact sound to determine the appropriate predetermined level to which the measured impact force corresponds.

In step S17, a sound/display unit 125 in the MSM 120 is utilized to determine the output data corresponding to the measured impact force. The sound/display unit 125 may retrieve digital audio and/or visual output data corresponding to the measured impact force from the memory 130.

In step S19, the retrieved audio and/or visual output data are utilized to generate the appropriate output. Audio data is transferred to an audio output unit 150 through a sound generator 127 in the MSM 120 and visual data is transferred to the display 140 through a visual display generator 126 in the MSM. The audio output unit 150 outputs sound while the display unit 140 displays visual data. It is contemplated that the sound/display unit 125 may transfer only audio data or only visual data depending on a state set by the user.

The apparatus and method of the present invention have several advantages. Because the imminent closing of the folder portion of a folder-type device may be determined by the specific angle between the folder portion and main body portion, the impact force when the folder portion contacts the main body portion may be measured. Determining the strength of the impact upon closure of the folder portion rather than just the open/closed configuration the folder portion allows the user to be provided with important information that may decrease wear on the folder-type device and lessen the tendency of the folder portion to break The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for sensing the impact of closing the folder portion of a folder-type device having a folder portion and main body portion, comprising:
    detecting means that determines when the folder portion of the device is closed;
    measuring means that measures an impact when the folder portion is closed;
    output means;
    storage means that contains information regarding predetermined levels of impact force, the information corresponding to at least one level of folder portion closing strength, and output data corresponding to the at least one level of folder portion closing strength; and
    processing means that compares the impact measured by the measuring means to the information stored in the storage means to determine the folder portion closing strength and outputs the corresponding output data to the output means.

2. The apparatus of claim 1, wherein the detecting means detects closing of the folder portion when the main body and the folder portion narrows at a specific angle.

3. The apparatus of claim 1, the folder portion comprising a magnet and wherein the detecting means senses the magnetic force of the magnet in order to determine when the folder portion is closed.

4. The apparatus of claim 3, wherein the detecting means comprises a Hall effect device.

5. The apparatus of claim 1, the output data having an audio component and wherein the processing means and output means are adapted to provide an audio response to the closing of the folder portion.

6. The apparatus of claim 1, the output data having a visual component and wherein the processing means and output means are adapted to provide a visual response to the closing of the folder portion.

7. The apparatus of claim 1, the output data having both a visual and audio component and wherein the processing means and output means are adapted to provide both a visual and an audio response to the closing of the folder portion.

8. The apparatus of claim 1, wherein the output means composes a speaker.

9. The apparatus of claim 1, wherein the output means comprises a display.

10. The apparatus of claim 1, the measuring means comprising a microphone, an amplifier, and a filter and wherein the recorded impact sound is converted to a DC level.

11. The apparatus of claim 10, wherein the filter is a low-pass filter.

12. The apparatus of claim 10, the processing means comprising an analog-digital converter and adapted to cause the measuring means to record the impact sound when the main body and the folder portion narrows at a specific angle, compare the recorded impact sound to the information regarding predetermined levels of impact force in the storage means, and retrieve the corresponding output data from the storage means.

13. An apparatus for sensing the impact of closing the folder portion of a folder-type device having a folder portion and main body portion, comprising:
    a detector for determining when folder portion is closed;
    an audio circuit for recording the impact sound when the folder portion is closed;
    a driving unit for controlling the audio circuit;
    a strength determining unit for determining the strength of the recorded impact sound;
    an output unit for conveying information corresponding to the measured strength of the impact sound; and
    a memory for storing output data and at least one predetermined level of folder portion closing impact strength,
    wherein the driving unit causes the audio circuit to record the impact sound when the detector determines a specific angle between the folder portion and main body portion.

14. The apparatus of claim 13, wherein the strength determining unit determines the strength of the impact sound by converting the recorded impact sound to a digital signal and comparing the digital signal with the at least one predetermined level of folder portion closing impact strength stored in the memory.

15. The apparatus of claim 13, wherein the output data is determined according to the at least one predetermined level of folder portion closing impact strength stored in the memory.

16. The apparatus of claim 13, wherein the detector comprises a Hall effect device.

17. The apparatus of claim 13, the audio circuit comprising a microphone, an amplifier, and a filter and wherein the recorded impact sound is converted to a DC level.

18. The apparatus of claim 17, wherein the filter is a low pass filter.

19. The apparatus of claim 13, wherein the strength determining unit comprises an analog-digital converter and is adapted to cause the audio circuit to record the impact sound when the main body and the folder portion narrow at a specific angle, compare the recorded impact sound to the at least one predetermined level of folder portion closing impact strength in the memory, and retrieve the corresponding output data from the memory.

20. The apparatus of claim 13, wherein the output unit comprises a speaker.

21. The apparatus of claim 13, wherein the output unit comprises a display.

22. A method for sensing for sensing the impact of closing the folder portion of a folder-type device having a folder portion and main body portion, comprising:
    detecting closure of the folder portion;
    measuring the impact force upon closure of the folder portion;
    determining the relative strength of the measured impact force;
    retrieving audio and visual data corresponding to the measured impact force from a memory;
    transferring the retrieved audio data to an audio output unit; and
    transferring the retrieved visual data to a display.

23. The method of claim 22, further comprising detecting when the folder portion is at a specific angle with respect to the main body portion.

24. The method of claim 22, further comprising:

powering an audio input circuit when closing of the folder portion is detected; and recording the impact sound through the audio input circuit.

25. The method of claim 24, further comprising:

receiving the impact sound through a microphone;

amplifying the received impact sound; and converting the amplified impact sound to a DC level through filtering.

26. The method of claim 22, further comprising:

converting a DC level corresponding to the measured impact force to digital data;

comparing the digital data to predetermined impact strength level digital information stored in a memory to determine the relative strength of the measured impact force; and determining the output corresponding to the relative strength of the measured impact force.

* * * * *